United States Patent
Stephenson et al.

(10) Patent No.: US 6,831,712 B1
(45) Date of Patent: Dec. 14, 2004

(54) POLYMER-DISPERSED LIQUID-CRYSTAL DISPLAY COMPRISING AN ULTRAVIOLET BLOCKING LAYER AND METHODS FOR MAKING THE SAME

(75) Inventors: Stanley W. Stephenson, Spencerport, NY (US); Mary C. Brick, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/445,761

(22) Filed: May 27, 2003

(51) Int. Cl.[7] ............................................. G02F 1/13
(52) U.S. Cl. ......................... 349/86; 349/104; 349/105
(58) Field of Search ............................... 349/105, 104, 349/86, 87, 88, 89

(56) References Cited

U.S. PATENT DOCUMENTS

| | | | |
|---|---|---|---|
| 5,539,552 A | | 7/1996 | Desai et al. |
| 5,615,040 A | * | 3/1997 | Watanabe .................. 359/288 |
| 5,736,308 A | | 4/1998 | Schmuck et al. |
| 6,307,671 B1 | * | 10/2001 | Yabuki ....................... 359/361 |
| 6,586,057 B1 | * | 7/2003 | Yabuki ....................... 428/1.1 |
| 6,689,533 B2 | * | 2/2004 | Irita ........................... 430/203 |

OTHER PUBLICATIONS

USSN 09/915,441, S. W. Stephenson et al., A Dielectric Layer for Dispersed Liquid Crystal Coatings, (D83142/CPK).

* cited by examiner

Primary Examiner—James A. Dudek
(74) Attorney, Agent, or Firm—Chris P. Konkol

(57) ABSTRACT

A display comprising a substrate, transparent first conductors, second conductors, a layer of polymer-dispersed liquid-crystal material disposed between the first and second conductors, and at least one layer of ultraviolet blocking material in a binder disposed to block ultraviolet radiation from striking said polymer-dispersed liquid-crystal material is disclosed. Also disclosed is a method for making such a display.

20 Claims, 3 Drawing Sheets

POLYMER-DISPERSED LIQUID-CRYSTAL DISPLAY COMPRISING AN ULTRAVIOLET BLOCKING LAYER AND METHODS FOR MAKING THE SAME

CROSS REFERENCE TO RELATED APPLICATIONS

Reference is made to commonly assigned U.S. Pat. No. 6,394,870 filed Aug. 24, 1999 by Dwight J. Petruchik et al., and U.S. patent application Ser. No. 09/723,389, filed Nov. 28, 2000 by David M. Johnson et al., the disclosures of which are incorporated herein by reference.

FIELD OF THE INVENTION

The present invention relates to providing an ultraviolet blocking layer for polymer-dispersed liquid-crystal displays.

BACKGROUND OF THE INVENTION

Currently, information is commonly displayed using assembled sheets of paper carrying permanent inks or displayed on electronically modulated surfaces such as cathode ray displays or liquid crystal displays. Other sheet materials can carry magnetically writable areas to carry ticketing or financial information. Magnetically written data, however, is not visible.

A structure is disclosed in PCT/WO 97/04398, entitled "Electronic Book With Multiple Display Pages" which is a thorough recitation of the art of thin, electronically visibly written display technologies. Disclosed is the assembling of multiple display sheets that are bound into a "book," each sheet arranged to be individually addressed. The patent recites prior art disclosing thin, electronically written pages in the form of flexible sheets, including image-modulating material formed from a bistable liquid crystal system and thin metallic conductor lines on each page.

Fabrication of flexible, electronically written display sheets are also disclosed in U.S. Pat. No. 4,435,047. A first sheet has transparent ITO conductive areas and a second sheet has electrically conductive inks printed on display areas. The sheets can be glass, but in practice have been formed of Mylar® polyester. A dispersion of liquid-crystal material in a binder is coated on the first sheet, and the second sheet is bonded to the liquid-crystal material. Electrical potential applied to opposing conductive areas operate on the liquid-crystal material to selectively expose display areas. The display uses nematic liquid-crystal material which ceases to present an image when de-energized.

U.S. Pat. No. 5,437,811 discloses a light-modulating cell having a polymer-dispersed chiral-nematic liquid crystal, also referred to as polymer-dispersed cholesteric liquid crystal. The chiral-nematic liquid crystal has the property of being driven between a planar state reflecting a specific visible wavelength of light and a light-scattering focal-conic state. Said structure has the capacity of maintaining either one of the given states in the absence of an electric field.

U.S. Pat. No. 5,539,552 recites failures of liquid-crystal displays due to ultraviolet light affecting the liquid-crystal material, seals and thin films in displays. The patent discloses a solution for these problems by incorporating a glass plate that is compatible with the display, approximately 36 mils thick. The resulting display blocks 99 percent of ultraviolet light energy with wavelength less than 400+/−10 nanometers. Such plates, however, are inflexible, heavy and expensive.

It would be desirable to provide a method of providing a polymer-dispersed cholesteric display with protection from ultraviolet ("UV") radiation without requiring the presence of glass plates. It would be desirable to provide UV protection for a display having a thin flexible substrate.

It is known that fine particles of titanium dioxide in a binder can provide a visually transparent ultraviolet blocking layer that blocks ultraviolet radiation. U.S. Pat. No. 5,736,308 discloses a method in the photographic arts to produce titanium dioxide particles that are transparent to visible light and absorbent to UV light of a broad spectrum. Titanium dioxide ($TiO_2$) pigment having an average size from 0.02 to 0.1 microns is formed, which exhibits good absorption from 290 to 400 nanometers while being functionally transparent in the visible region. U.S. Pat. No. 5,736,308 discloses a multilayer photographic film with a UV protective layer using fine titanium dioxide particles. The $TiO_2$ particles are dispersed in "gelatine" (gelatin). A considerably thinner layer is achieved than with customary organic UV blocker dyes that are dispersed in oil droplets.

Another problem in the prior art relates to the manufacture of displays made by coating layers of materials to form polymer-dispersed liquid-crystal display sheets. Polymer-dispersed liquid-crystal layers can be vacuum coated with conductive metal which is then laser etched to form an image-forming electrode. The use of laser etching can be problematic in that the UV laser that produces etching in one layer of the structure has the potential to damage the other layers, for example another conductor layer, in the structure, typically an intermediate, on an assembly line, formed in the manufacture of a display. This potential problem can limit, render difficult, or even prevent the use of desired or optimal laser-etching techniques Thus, it would be useful and advantageous to impart UV blocking, in this case blocking of a UV laser, into the intermediate structures used to make display sheets. For example, it would be advantageous to provide UV blocking to protect a first conductors not intended to be etched during a laser etching process involving a second or different conductor.

In view of the above, it would be desirable to either protect a polymer-dispersed liquid-crystal display from UV radiation during use and/or to protect a polymer-dispersed liquid-crystal display, or intermediate thereof, from UV radiation during manufacture.

SUMMARY OF THE INVENTION

It is the main object of this invention to protect polymer-dispersed liquid-crystal displays from ultraviolet light during use. In another aspect of this invention, it is possible to protect the same or manufacturing intermediates thereof from ultraviolet radiation from an ultraviolet laser used for etching of conductors during manufacture. This invention can be used to protect second conductors in the display from ultraviolet radiation during laser etching of first conductors. It is possible for the same means that provides a polymer-dispersed liquid-crystal display with ultraviolet protection during use to also function to protect the display, or manufacturing intermediate thereof, from ultraviolet radiation during manufacture.

These objects are achieved by a display comprising:
- a) a substrate;
- b) transparent first conductors;
- c) second conductors;
- d) a layer comprising polymer-dispersed liquid-crystal material disposed between the first and second conductors;

e) at least one barrier layer comprising a polymeric binder and water-dispersible or water-soluble ultraviolet blocking compounds or particles, which barrier layer is disposed to block ultraviolet radiation from striking said polymer-dispersed liquid-crystal material.

In one embodiment of a display according to the present invention, the barrier layer comprises ultraviolet-blocking inorganic particles in a binder. Fine particles such as titanium dioxide and/or other inorganic ultraviolet-absorbing particles can be incorporated in the barrier layer of the display. For example, a low concentration of $TiO_2$ particles can block UV radiation. Alternatively, a ultraviolet-blocking dye can be used, preferably contained in a discrete organic phase within a continuous aqueous phase in the barrier layer. Such UV-blocking materials are chemically and electrically inert. Thus, the barrier layer can be located between the electrodes of the display without affecting display performance.

The invention is also directed to a method of manufacturing the above display.

DETAILED DESCRIPTION OF THE PREFERRED EMBODIMENT

Figure 1:
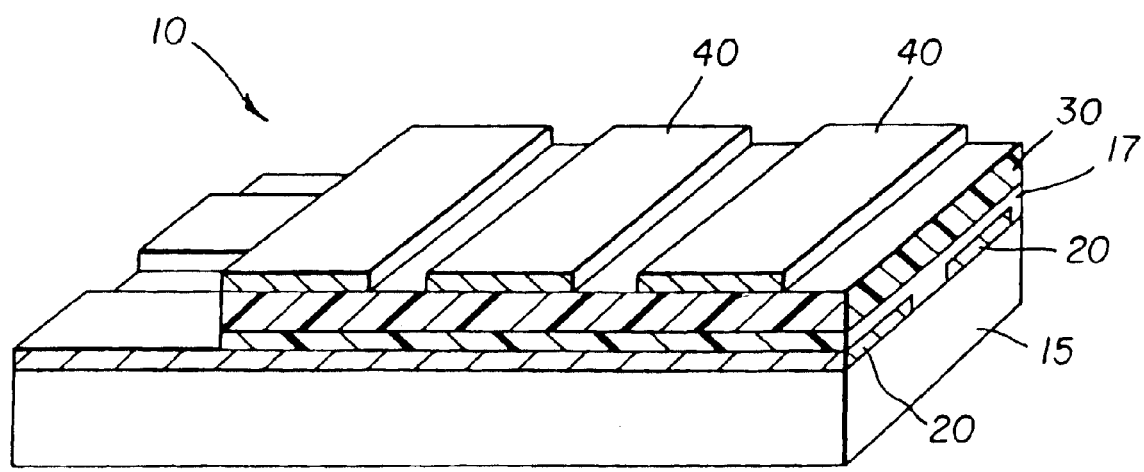
FIG. 1 is a sectional view of a sheet having a coated liquid-crystal material in accordance with the present invention.

As indicated above, the present invention involves a display comprising a substrate, transparent first conductors, second conductors, a layer of polymer-dispersed liquid-crystal material disposed between the first and second conductors, and at least one layer comprising water-dispersible or water-soluble ultraviolet blocking compounds or particles in a polymeric binder, which layer is disposed to block ultraviolet radiation from striking said polymer dispersed liquid crystal.

The ultraviolet-blocking materials that can be used in the present invention are diverse so long as they are water-dispersible or water-soluble and can absorb or otherwise block ultraviolet radiation without adversely affecting the desired reflection of visible light in the display. Ultraviolet blocking compounds conventionally used to absorb UV light in other contexts can be used, for example, aryl-substituted benzotriazole compounds (U.S. Pat. No. 3,533,794, DE 42 29 233), 4-thiazolidone compounds (U.S. Pat. No. 3,314, 794, U.S. Pat. No. 3,352,681), benzophenone compounds (JP-A-2784/71), cinnamic acid esters (U.S. Pat. No. 3,705, 805, U.S. Pat. No. 3,707,375), butadiene compounds (U.S. Pat. No. 4,045,229), benzoxazole compounds (U.S. Pat. No. 3,700,455), arylsubstituted triazine compounds (DE 21 13 833, EP 520 938, EP 530 135, EP 531 258) and benzoylthiophene compounds (GB 973 919, EP 521 823). UV absorbing photographic couplers or polymers can also used. UV absorbing polymers can be also be employed. Non-water soluble dyes can be dissolved in an hydrophobic phase or themselves form a hydrophobic phase dispersed in an aqueous continuous phase. Thus, UV blockers can be in the form of dispersed particles, either organic or inorganic and either solid or liquid. Certain UV absorbing dyes are water soluble. Mixtures of UV blocking materials can be used.

$TiO_2$ particles including both anatase and rutile forms and zinc oxide (ZnO) can be used to block UV radiation. One preferred embodiment of a UV blocker is $TiO_2$ pigment in the form of particles having an average primary particle diameter of 1 to 100 nm, preferably of 5 to 50 nm. These $TiO_2$ pigments are transparent and, unlike conventional $TiO_2$-based white pigments (rutile and anatase) with an optimum particle size of approximately 0.2 $\mu$m, they have virtually no light-scattering characteristics. They are moreover colorless. Transparent $TiO_2$ in rutile form is particularly advantageous as a UV absorber in the present invention. The $TiO_2$ pigments according to the invention are particularly advantageous where more than 90% of the primary particles have a diameter of less than 100 nm. Transparent $TiO_2$ pigments having the stated characteristics are known, for example, see Gunter Buxbaum, Industrial Inorganic Pigments, VCH Weinheim, N.Y., Basel, Cambridge, Tokyo (1993), pages 227 to 228, and also U.S. Pat. No. 5,736,308, hereby incorporated by reference. It is known from DE 43 02 896 that $TiO_2$ pigments containing iron oxide have an overall higher absorbance in the UV range than corresponding $TiO_2$ pigments containing no iron oxide. $TiO_2$ pigments containing iron oxide having an average primary particle diameter of 1 to 100 nm, preferably of 5 to 50 nm and an iron oxide content of 0.01 to 20 wt. %, preferably of 0.05 to 10 wt. %, particularly preferably of 0.5 to 5 wt. % are a preferred UV absorber in the present invention for use in a UV protective layer. $Fe_2O_3$ may primarily be considered as the iron oxide, and $TiO_2$ of rutile structure is preferably used. The $TiO_2$ pigments containing iron oxide are preferably coated on the surface with $SiO_2$ or $Al_2O_3$. It is particularly advantageous for the $TiO_2$ pigments containing iron oxide to be dispersed in a gelatin solution so that they may be cast into a layer. In this manner, a thin layer is achieved.

One particle dispersion for a UV protective layer comprises 2% by weight gelatin and 0.5% by weight $TiO_2$. Either deionized or undeionized gel can be used. Preferably, the coated layer, after drying is less than 1 micron thick, preferably less than 0.2 micron thick.

In another embodiment of the invention, water-insoluble UV-absorbing compounds such as are sold under the brand name Tinuvin® UV absorbers can be dissolved in oil to form particles that can be dispersed in a gelatin binder to form an emulsion that can be coated onto the display structure during manufacture. Water-insoluble UV absorbing compounds in liquid form can also be used to form dispersed particles without requiring a solvent.

In one preferred embodiment of the invention, the display comprises (a) a flexible transparent support; (b) transparent first conductors; (c) second optionally transparent conductors (for example, in a privacy screen; (d) an imaging layer comprises of polymer dispersed liquid crystal material disposed between the first and second conductors; and (e) at least one coated barrier layer, preferably less than 1 micron thick, disposed between the two conductors, which coated layer comprises ultraviolet blocking compounds or particles (either solid or liquid, organic or inorganic) mixed with a hydrophilic polymeric binder, preferably gelatin, and which coated layer is disposed to block ultraviolet radiation from striking said polymer dispersed liquid crystal. In one particularly preferred embodiment, the coated layer is disposed between the transparent first conductors and the layer of polymer-dispersed liquid-crystal material.

Another aspect of the present invention relates to the fabrication or manufacture of a display or intermediate component thereof, which process comprises providing a substrate, applying transparent first conductors over the substrate, coating a layer of polymer-dispersed liquid-crystal material disposed over the first conductors, and forming second conductors over said polymer dispersed liquid crystal material, wherein the process further comprises providing at least one layer comprising ultraviolet blocking material dispersed in the layer with a binder, which layer is disposed to block ultraviolet radiation from striking said polymer-dispersed liquid crystal. The barrier layer is preferably disposed between the first and second conductors, more preferably between the first conductors and the imaging layer. Optionally the barrier layer and the imaging layer can be coated simultaneously in a single composite film.

Referring now to the figures, FIG. 1 is an isometric view of a display 10 in accordance with one embodiment of the present invention. Flexible substrate 15 can be a thin transparent polymeric material such as Kodak Estar® film base formed of polyester plastic that has a thickness of between 20 and 200 micrometers. In an exemplary embodiment, substrate 15 can be a 125 micrometer-thick sheet of polyester film base. Other polymers, such as transparent polycarbonate, can also be used.

In FIG. 1, first conductors 20 are formed over substrate 15. First conductors 20 can be, for example, tin-oxide or indium-tin-oxide (ITO), with ITO being the preferred material. Typically, the material of first conductors 20 is sputtered as a layer, over substrate 15, having a resistance of less than 500 ohms per square [units?]. The layer is then patterned to form first conductors 20 in any well-known manner.

Alternatively, transparent first conductors 20 can also be formed by printing a transparent organic conductor such as PEDT/PSS, PEDOT/PSS polymer, which materials are sold as Baytron® P by Bayer AG Electronic Chemicals. Alternatively again, first conductors 20 can be an opaque electrical conductor material such as copper, aluminum or nickel. If first conductors 20 are an opaque metal, the metal can have an oxidized surface to provide a light-absorbing surface. First conductors 20 can be formed in a conductive coating by conventional lithographic or laser etching means.

Barrier layer or coating 17, also referred to as the "ultraviolet-radiation blocking layer," "UV protective layer," or the like, is applied over first conductors 20. In the embodiment of FIG. 1, barrier layer 17 is a thin coating that electrically isolates first conductors 20 as well as provides UV protection. In the preferred embodiment, barrier layer 17 is a coated and dried layer comprising a UV blocking agent and gelatin that is approximately 0.50 micron thick. In one example, barrier layer 17 includes a concentration of fine $TiO_2$ particles to block ultraviolet radiation.

As used herein, when referring to a barrier layer being "disposed between" two other layers it means, unless otherwise indicated, that the barrier layer is at least partially between the other two layers or, in other words, at least forms a surface area or sub-layer between the other layers. However, it is possible for the barrier layer to extend into another layer (that is, is not necessarily exclusively between the other layers) as shown in FIG. 1 wherein the barrier layer 17 extends both over the layer formed by conductors 20 but is also present within the layer formed by conductors 20.

To illustrate one method of making such a display 10, barrier layer 17 is aqueous coated and dried over first conductor 20 prior to application of an aqueous polymer-dispersed liquid-crystal layer 30. Barrier layer 17 can be, for example, a dried coating of a 1.3% deionized gelatin solution coated at a rate of 0.38 cc per square meter. The resulting dried coating forms a barrier coating that is about 0.5 microns thick. A display in accordance with FIG. 1, assembled and incorporating protective or barrier layer 17 can serve a plurality of functions. For example, such a barrier layer can also function to effectively prevent image defects due to defects in the coating of the polymer-dispersed liquid-crystal layer. In addition, the same barrier layer can be used to provide effective insulation, as confirmed by electrical testing, between conductors in the same layer used in changing the state of the cholesteric liquid-crystals material in the imaging or polymer-dispersed cholesteric layer 30.

In one embodiment of the invention, polymer-dispersed cholesteric layer 30 covering barrier layer 17 includes a polymeric-dispersed cholesteric liquid-crystal material such as those disclosed in U.S. Pat. No. 5,695,682, the disclosure of which is incorporated by reference. Application of electrical fields of various intensity and duration can drive a chiral-nematic (cholesteric) material into a reflective state, to a transmissive state, or to an intermediate state. These materials have the advantage of maintaining a given state indefinitely, after the field is removed. Cholesteric liquid crystal materials can be, for example, Merck® BL112, BL118 or BL126, available from E.M. Industries of Hawthorne, N.Y.

In a preferred embodiment, polymer-dispersed cholesteric layer 30 comprises E.M. Industries' cholesteric material BL-118 that is subsequently dispersed in deionized photographic gelatin to form an emulsion. For example, the liquid-crystal material is dispersed at 8% concentration in a 5% deionized-gelatin aqueous solution. The mixture is dispersed to provide, on average, 10 micrometer-diameter domains, on average, of the liquid crystal in aqueous suspension. The material is coated over patterned ITO first conductors 20 to provide a 9-micron-thick polymer-dispersed cholesteric coating. Other organic binders such as polyvinyl alcohol (PVA) or polyethylene oxide (PEO) can be used. Such compounds are machine coatable on various equipment, including but not limited to equipment of the type associated with the making of photographic films. A conventional surfactant can be added to the emulsion to improve adhesion to the underlying layer. Conventionally known surfactants can be employed and provided at a concentration that corresponds to the critical micelle concentration (CMC) of the solution.

The barrier layer 17 can be applied over the first conductors 20 prior to applying a coating of the polymer-dispersed cholesteric layer 30. The barrier coating can be a gel coating containing dispersed UV blocking materials. A gel coating in which UV blocking material can be included is disclosed in U.S. Patent U.S. Ser. No. 09/915,441 filed Jul. 26, 2001 by Stephenson et al., hereby incorporated by reference.

In the embodiment of FIG. 1, second conductors 40 overlay polymer-dispersed cholesteric layer 30. Second conductors 40 should have sufficient conductivity to carry a field across the polymer-dispersed cholesteric layer 30. Second conductors 40 can be formed in a vacuum environment using materials such as aluminum, tin, silver, platinum, carbon, tungsten, molybdenum, tin or indium or combinations thereof. The metal material can be excited by energy from resistance heating, cathodic are, electron beam, sputtering, or magnetron excitation. Oxides of said metals could be used to darken second conductors 40. Tin-oxide or indium-tin oxide coatings can permit second conductors 40 to be transparent to operate in conjunction with opaque first conductors 20. Vacuum deposited second conductors 40 can be areas delimited by etched areas in a conductive coating.

In a preferred embodiment, second conductors 40 are printed using a conductive ink such as Electrodag® 423SS screen-printable electrical conductive material from Acheson Corporation. Such printable materials are finely divided graphite particles in a thermoplastic resin. The second conductors 40 are formed using printed inks to reduce cost display. The use of a flexible support for substrate 15, laser etched first conductors 20, machine coated polymer-dispersed cholesteric layer 30, and printed second conductors 40 permit the fabrication of very low cost memory displays.

Figure 2:
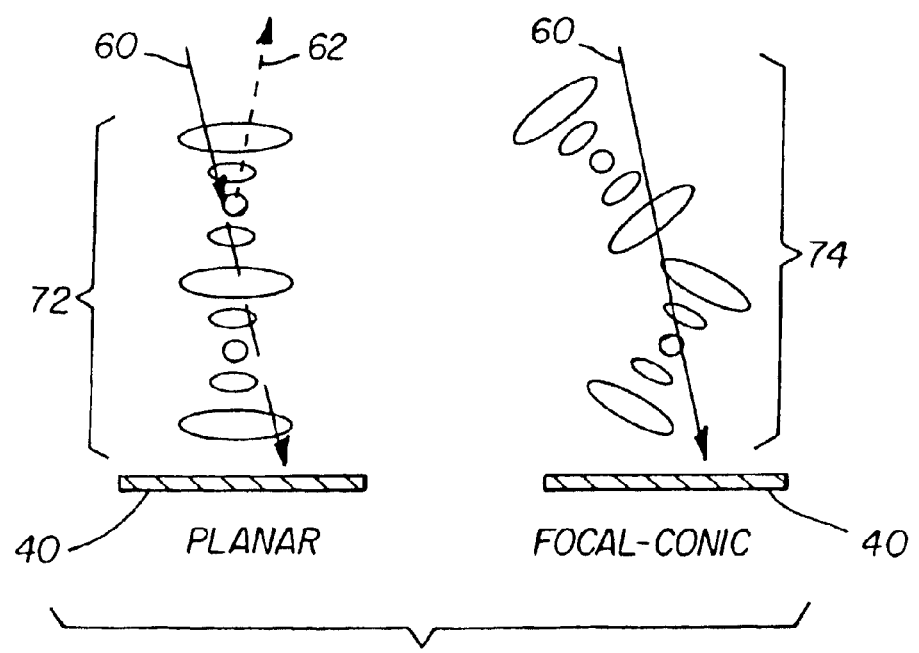
FIG. 2 is a sectional view showing a display with cholesteric material in two stable optical states.

FIG. 2 is a sectional view showing a portion of a display with cholesteric material in two stable optical states in adjacent areas of the display. On the left, a higher voltage field has been applied and quickly switched to zero potential, which causes the liquid crystal molecules in domains to become planar liquid crystals 72. On the right, application of a lower voltage field has caused molecules of the cholesteric liquid crystal in the domains to break into transparent tilted cells that are known as focal-conic liquid crystals 74. Varying electrical field pulses can progressively change the molecular orientation from planar state 72 to a fully evolved and transparent focal conic state 74.

Light-absorbing second conductors 40 are positioned on the side opposing the incident light 60. A thin layer of light-absorbing submicron carbon in a gel binder can be disposed between second conductors 40 and polymer-dispersed cholesteric layer 30 as disclosed in copending U.S. Ser. No. 10/036,149 filed Dec. 26, 2001 by Stephenson, hereby incorporated by reference. Focal-conic liquid crystals 74 are transparent (transmissive and light scattering), passing incident light 60, which is absorbed by second conductors 40 to provide a black image. Progressive evolution from planar to focal-conic state causes a viewer to see an initial bright reflected light 62 that transitions to black as the cholesteric material changes from planar state 72 to a fully evolved focal-conic state 74. The transition to the light-transmitting state is progressive, and varying the low-voltage time permits variable levels of reflection. These variable levels can be mapped out to corresponding gray levels, and when the field is removed, polymer dispersed cholesteric layer 30 maintains a given optical state indefinitely. The states are more fully discussed in U.S. Pat. No. 5,437,811.

Figure 3:
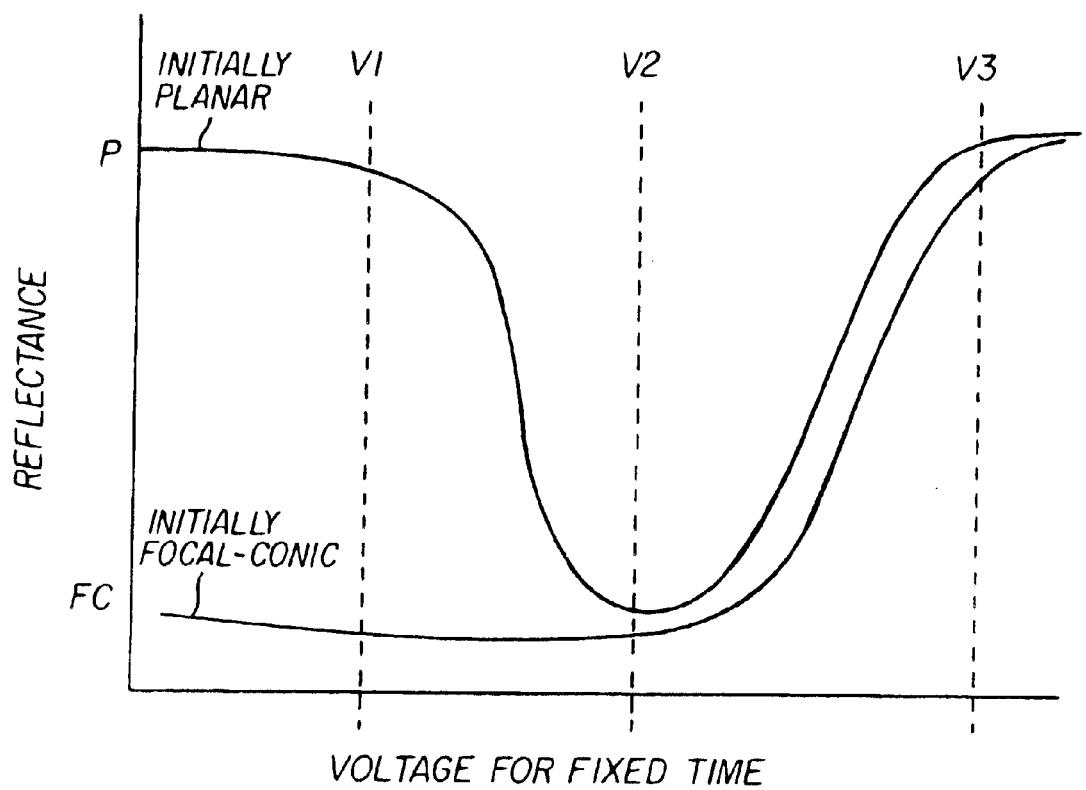
FIG. 3 is a plot of the response of a cholesteric to an electrical field of varying strength.

FIG. 3 is a plot of the response of a cholesteric material to a pulsed electrical field using one possible type of display driver mechanism. Such curves can be found in U.S. Pat. Nos. 5,453,863 and 5,695,682. For a given pulse time, typically between 5 and 200 milliseconds, a pulse at a given voltage can change the optical state of a cholesteric liquid crystal. Voltage below disturbance voltage V1 can be applied without changing the state of the cholesteric material. A higher voltage pulse at a focal-conic voltage V3 will force a cholesteric material into the focal conic state 52. A voltage pulse at planar voltage V4 will force the cholesteric material into the planar state 50. The curve characteristic of cholesteric liquid crystal permits passive matrix writing of cholesteric displays.

Figure 4:
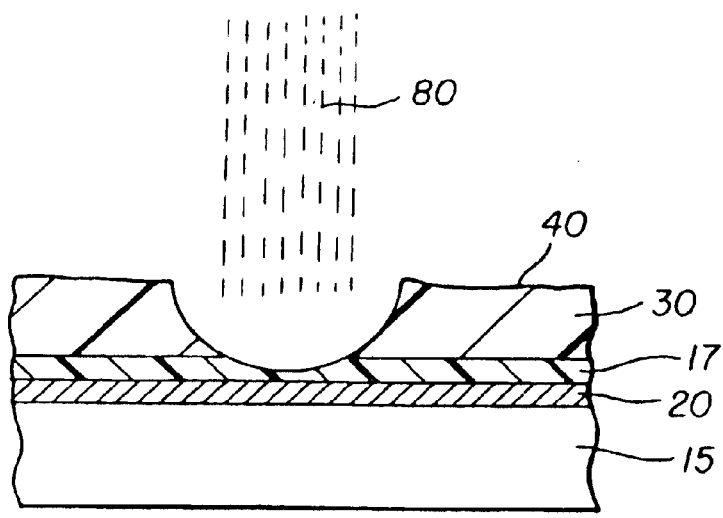
FIG. 4 is a sectional view of the metallic layer of FIG. 7 being laser etched.

FIG. 4 illustrates a method of fabricating a display in accordance with one aspect of the present invention. This method comprises: (a) providing a substrate 15; (b) forming transparent first conductors 20; (c) forming second conductors 40; (d) forming a layer of polymer-dispersed liquid-crystal material 30 disposed between the first and second conductors; (e) forming at least one barrier layer 17 comprising ultraviolet blocking material and a binder, which layer is disposed to block ultraviolet radiation from striking said polymer-dispersed liquid-crystal material, and (f) subsequently etching the second conductors with a UV laser beam 80 while the ultraviolet blocking material effectively absorbs UV radiation from the UV laser beam before the radiation reaches the first conductors, thereby effectively preventing damage to the first conductors. Methods of etching are disclosed in U.S. Pat. No. 6,236,442 to Stephenson et al., hereby incorporated by reference.

EXAMPLE

A coating according to the present invention was made to determine if UV absorbers were effective in accordance with the present invention. In a first test, a coating contained a dispersion containing 2 wt. % photographic-grade gelatin and 3 wt. % organic near ultraviolet blocking material. The ultraviolet blocking material is a mixture of 2-(2'-hydroxy-3',5'-di-tert-amylphenyl)benzotriazole (CAS 025973-555-1) and 2-(3'-tert-butyl-2'-hydroxy5'-methylphenyl)-5-chloro-benzotriazole (CAS 003896-11-5), each compound available under the brand name Tinuvin® from Ciba Corporation. The dispersion was coated at a rate of 11.6 cc per square meter onto a polyester support. The resulting layer was 0.70 microns thick. In a second test, $TiO_2$ particles were coated in gelatin onto the polyester support. The $TiO_2$ particles had an average particle size of 60 nm, and originated from a dispersion comprising (by weight percent) 10.9% $TiO_2$, 1.4% amino-trimethyl phosphonic acid dispersant CAS 002235-43-0, and 87.7% water. The resulting layer was 0.5 microns thick.

Figure 5:
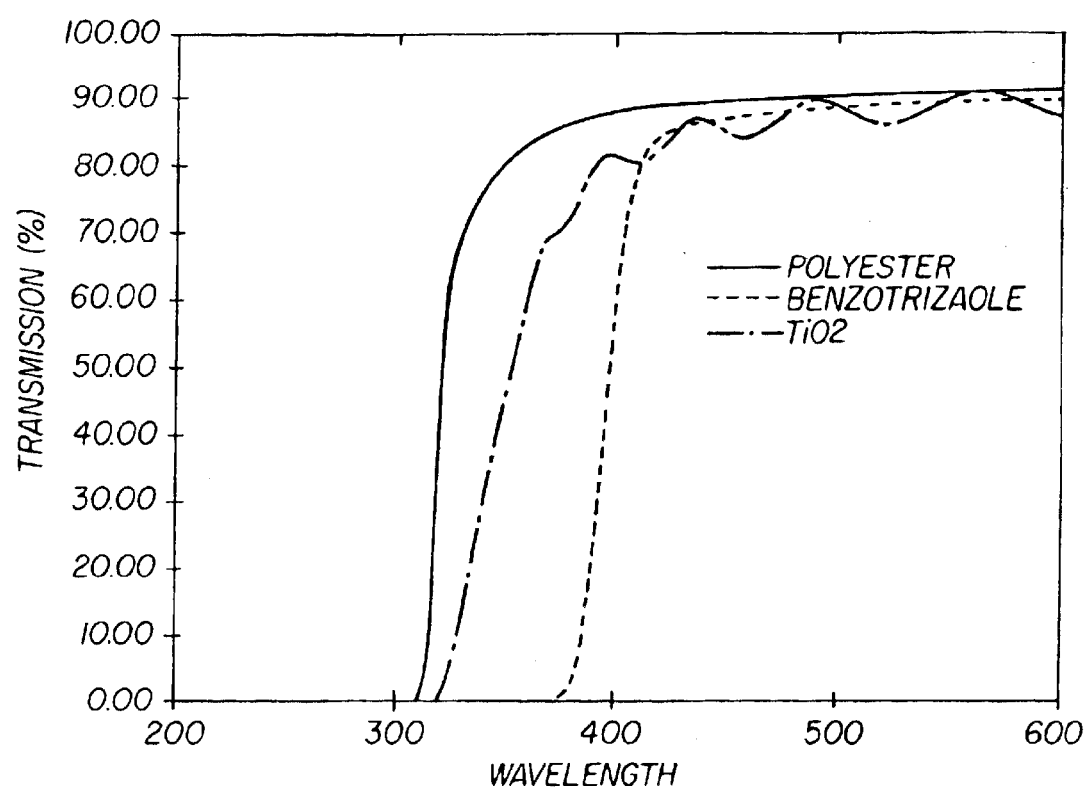
FIG. 5 shows a transmission spectroscopy of a polyester support, the support coated with the organic near ultraviolet blocking material, and the support coated with a titanium dioxide coating.

FIG. 5 shows the transmission spectroscopy of a 125-micron polyester support alone, the support coated with the organic near ultraviolet blocking material, and the support coated with the titanium dioxide coating that was 0.5 microns thick. The titanium-dioxide coating provides UV protection in the spectral region between 350 and 400 nanometers. The coating with the organic near ultraviolet blocking material provides almost complete blocking of the region. The coating with the organic near ultraviolet blocking material was, therefore, found to be more effective in protecting cholesteric liquid crystal than the $TiO_2$ blocking material. The coating with the ultraviolet blocking materials were thin enough to add the UV protection without significantly increasing in driving voltage.

The invention has been described in detail with particular reference to certain preferred embodiments thereof, but it will be understood that variations and modifications can be effected within the spirit and scope of the invention.

Parts List

10 display
15 display substrate
17 barrier coating
20 first conductors
30 polymer-dispersed cholesteric layer
40 second conductors
60 incident light
62 reflected light
72 planar liquid crystal
74 focal-conic liquid crystal
80 laser beam
V1 disturbance voltage V2 focal-conic voltage
V3 planar voltage

What is claimed is:

1. A display comprising:
   a) a substrate;
   b) transparent first conductors;
   c) second conductors;
   d) a layer comprising polymer-dispersed liquid-crystal material disposed between the first and second conductors;
   e) at least one barrier layer comprising a polymeric binder and water-dispersible or water-soluble ultraviolet blocking material, said barrier layer disposed to block ultraviolet radiation from striking said polymer-dispersed liquid-crystal material.

2. The display of claim 1 wherein the ultraviolet blocking material comprises a dissolved compound and/or dispersed particles.

3. The display of claim 1 wherein the ultraviolet blocking material is in the form of dispersed particles comprising a UV-absorbing organic compound, and wherein said polymeric binder is gelatin.

4. The display of claim 3 wherein the UV-absorbing organic compound is dissolved in an oil that is dispersed in said gelatin.

5. The display of claim 3 wherein the dispersed particle essentially consists of the UV-absorbing organic compound which forms a discrete hydrophobic phase in the barrier layer.

6. The display of claim 2 wherein the ultraviolet blocking material comprises particles selected from the group consisting of $TiO_2$, ZnO, iron oxide, and combinations thereof.

7. The display of claim 1 wherein the barrier layer is less than or about 1 micrometer thick.

8. The display of claim 7 wherein the ultraviolet blocking material comprises particles having an average diameter less than the thickness of the barrier layer.

9. The display of claim 1 wherein the barrier layer is also an insulating material separating said first conductors.

10. A display comprising;
    a) a flexible transparent support;
    b) a patterned first conductor layer comprising transparent first conductors;
    c) a patterned second conductor layer comprising second optionally transparent conductors;
    d) an imaging layer comprising polymer-dispersed liquid-crystal material disposed between the first and second conductors; and
    e) at least one barrier layer, less than about one micrometer thick, disposed between the two conductor layers, said barrier layer comprising water-dispersible or water-soluble ultraviolet blocking material with a hydrophilic polymeric binder, said barrier layer disposed to block ultraviolet radiation from striking said polymer-dispersed liquid-crystal material.

11. The display of claim 10 wherein the barrier layer is less than 1 micrometer thick.

12. The display of claim 10 wherein the barrier layer is less than 0.7 micrometer thick.

13. The display of claim 10 wherein the barrier layer is disposed between the first conductor layer and the imaging layer.

14. The display of claim 10 wherein the barrier layer comprises gelatin as the binder.

15. A method for fabricating a display comprising:
    a) providing a substrate;
    b) forming transparent first conductors over the substrate;
    c) coating a layer of polymer-dispersed liquid-crystal material disposed over the first conductors;
    d) forming at least one barrier layer comprising water-dispersible or water-soluble ultraviolet blocking material and a hydrophilic polymeric binder, said barrier layer disposed to block ultraviolet radiation from striking said polymer dispersed liquid crystal material;
    e) forming second conductors over said polymer dispersed liquid crystal material.

16. The method of claim 15 wherein the barrier layer is disposed between the transparent first conductors and the layer of polymer-dispersed liquid-crystal material.

17. The method of claim 16 wherein the barrier layer is also incorporated within the transparent first conductor layer separating conductors in said layer.

18. The method of claim 15 wherein the hydrophilic polymeric binder is gelatin.

19. The method of claim 15 wherein the ultraviolet blocking material comprises a dissolved organic compound and/or dispersed organic or inorganic particles.

20. A method of fabricating a display comprising
    a) providing a substrate;
    b) forming transparent first conductors;
    c) forming second conductors;
    d) forming a layer comprising polymer-dispersed liquid-crystal material disposed between the first and second conductors;
    e) forming at least one barrier layer comprising water-dispersible or water-soluble ultraviolet blocking material and a hydrophilic polymeric binder, said barrier layer disposed to block ultraviolet radiation from striking said polymer dispersed liquid crystal material;
    f) subsequently etching the second conductors with a ultraviolet laser beam while the ultraviolet blocking material absorbs substantial ultraviolet radiation from the ultraviolet laser beam before the radiation reaches the first conductors.

* * * * *